United States Patent
Wang et al.

(10) Patent No.: US 11,809,746 B2
(45) Date of Patent: Nov. 7, 2023

(54) SOLID STATE DISK, DATA TRANSMITTING METHOD AND INTERMEDIARY CONTROLLER TO SUPPORT REDUCED SSD CONTROLLER PAD COUNT

(71) Applicant: MACRONIX INTERNATIONAL CO., LTD., Hsinchu (TW)

(72) Inventors: Kuan-Chieh Wang, Taipei (TW); Shih-Chou Juan, Taoyuan (TW); Nai-Ping Kuo, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 54 days.

(21) Appl. No.: 17/541,306

(22) Filed: Dec. 3, 2021

(65) Prior Publication Data
US 2023/0176779 A1    Jun. 8, 2023

(51) Int. Cl.
*G06F 3/06*    (2006.01)

(52) U.S. Cl.
CPC .......... *G06F 3/0659* (2013.01); *G06F 3/0626* (2013.01); *G06F 3/0656* (2013.01); *G06F 3/0679* (2013.01)

(58) Field of Classification Search
CPC .... G06F 3/0659; G06F 3/0626; G06F 3/0656; G06F 3/0679; G06F 13/1673; G06F 3/0655
See application file for complete search history.

(56) References Cited

U.S. PATENT DOCUMENTS

| | | | | |
|---|---|---|---|---|
| 5,369,504 | A * | 11/1994 | Walker | H04N 1/0473 358/437 |
| 7,437,497 | B2 * | 10/2008 | Cornelius | G11C 7/109 711/101 |
| 10,223,003 | B2 | 3/2019 | Kim et al. | |
| 10,741,231 | B1 | 8/2020 | Tsai et al. | |
| 10,937,471 | B2 | 3/2021 | Jang et al. | |
| 11,170,869 | B1 * | 11/2021 | Helmick | H03M 13/1145 |
| 2007/0106836 | A1 | 5/2007 | Lee et al. | |

(Continued)

FOREIGN PATENT DOCUMENTS

TW    I722869 B    3/2021

*Primary Examiner* — Charles Rones
*Assistant Examiner* — Hewy H Li
(74) *Attorney, Agent, or Firm* — McClure, Qualey & Rodack, LLP

(57) ABSTRACT

A solid state disk, a data transmitting method and an intermediary controller thereof are provided. The solid state disk includes at least two flash memories, a SSD controller and an intermediary controller. The intermediary controller is connected between the flash memories and the SSD controller. The intermediary controller includes at least two flash interfaces, a customized interface and a data buffering unit. The flash interfaces are connected to the flash memories. The customized interface is connected to the SSD controller. The intermediary controller has a first clock domain and a second clock domain. The first clock domain is used for transmitting data from the flash memories to the data buffering unit. The second clock domain is used for transmitting data from the data buffering unit to the SSD controller. A frequency of the second clock domain is higher than a frequency of the first clock domain.

20 Claims, 10 Drawing Sheets

(56) References Cited

U.S. PATENT DOCUMENTS

| | | | |
|---|---|---|---|
| 2008/0140945 A1* | 6/2008 | Salessi | G06F 3/0616 |
| | | | 711/E12.087 |
| 2016/0299525 A1 | 10/2016 | Cho et al. | |
| 2019/0196996 A1* | 6/2019 | Balakrishnan | G06F 13/30 |
| 2020/0272564 A1* | 8/2020 | Keeth | H01L 25/18 |
| 2021/0134336 A1* | 5/2021 | Na | G11C 29/028 |
| 2022/0011934 A1* | 1/2022 | Tatapudi | G06F 3/061 |

\* cited by examiner

SOLID STATE DISK, DATA TRANSMITTING METHOD AND INTERMEDIARY CONTROLLER TO SUPPORT REDUCED SSD CONTROLLER PAD COUNT

TECHNICAL FIELD

The disclosure relates in general to a storage device, a data transmitting method and an intermediary controller thereof, and more particularly to a solid state disk, a data transmitting method and an intermediary controller thereof.

BACKGROUND

Along with the development of the memory technology, varied storage devices are invented. For example, solid state disk (SSD) uses integrated circuit assemblies to store data persistently. Compared with electromechanical drives, the solid state disk is typically more resistant to physical shock, runs silently, and has quicker access time and lower latency.

In the solid state disk, the die size of a SSD controller is determined by the pads of a plurality channels rather by the size of the core. As the quantity of flash memories increases, so does the quantity of pads. How to reduce the quantity of pads to reduce the size of the SSD controller has become one of the research directions.

SUMMARY

The disclosure is directed to a solid state disk (SSD), a data transmitting method and an intermediary controller thereof. A frequency of a second clock domain in the intermediary controller is higher than a frequency of a first clock domain in the intermediary controller, so the total quantity of pads of a SSD controller can be reduced and the die size of the SSD controller can be reduced.

According to one embodiment, a solid state disk (SSD) is provided. The solid state disk includes at least two flash memories, a SSD controller and an intermediary controller. The intermediary controller is connected between the flash memories and the SSD controller. The intermediary controller includes at least two flash interfaces, a customized interface and a data buffering unit. The flash interfaces are connected to the flash memories. The customized interface is connected to the SSD controller. The data buffering unit is connected between the flash interfaces and the customized interface. The intermediary controller has a first clock domain and a second clock domain. The first clock domain is used when data is transmitted from the flash memories to the data buffering unit. The second clock domain is used when data is transmitted from the data buffering unit to the SSD controller. A frequency of the second clock domain is higher than a frequency of the first clock domain.

According to another embodiment, a data transmitting method of a solid state disk (SSD) is provided. The solid state disk includes at least two flash memories, a SSD controller and an intermediary controller. The data transmitting method includes the following steps. Data is transmitted from the flash memories to the intermediary controller under a first clock domain. Data is transmitted from the intermediary controller to the SSD controller under a second clock domain. A frequency of the second clock domain is higher than a frequency of the first clock domain.

According to an alternative embodiment, an intermediary controller is provided. The intermediary controller is connected between at least two flash memories and a SSD controller. The intermediary controller includes at least two flash interfaces, a customized interface and a data buffering unit. The flash interfaces are connected to the flash memories. The customized interface is connected to the SSD controller. The data buffering unit is connected between the flash interfaces and the customized interface. The intermediary controller has a first clock domain and a second clock domain. The first clock domain is used when data is transmitted from the flash memories to the data buffering unit. The second clock domain is used when data is transmitted from the data buffering unit to the SSD controller. A frequency of the second clock domain is higher than a frequency of the first clock domain.

Figure 1:
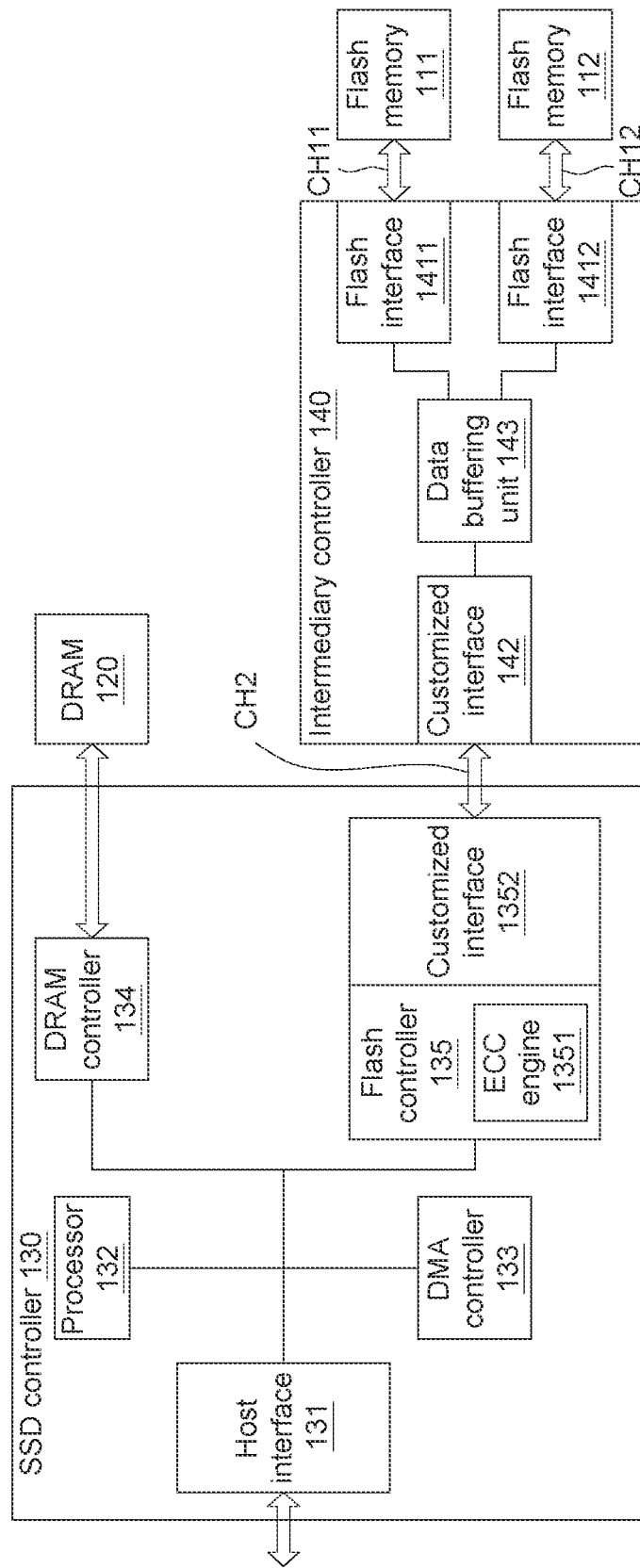
FIG. 1 shows a block diagram of a solid state disk (SSD) according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please referring to FIG. 1, a block diagram of a solid state disk (SSD) 100 according to one embodiment is shown. The solid state disk 100 includes at least two flash memories 111, 112, a Dynamic Random Access Memory (DRAM) 120, a SSD controller 130 and an intermediary controller 140. The flash memories 111, 112 are used for storing data for a long time. The DRAM 120 is used for temporarily storing data. The DRAM 120 is connected to the SSD controller 130. The intermediary controller 140 is connected between the SSD controller 130 and the flash memories 111, 112. For example, the flash memories 111, 112, the DRAM 120, the SSD controller 130 and the intermediary controller 140 may be chips disposed on a circuit board.

The SSD controller 130 includes, for example, a host interface 131, a processor 132, a Direct Memory Access (DMA) controller 133, a DRAM controller 134 and a flash controller 135. The host interface 131 is used to communicate with a host. The processor 132 is used to control the elements in the SSD controller 130. The DMA controller 133 is used to control the data transmission. The flash controller 135 includes an Error-Correcting Code engine (ECC engine) 1351 and a customized interface 1352. The ECC engine 1351 is used to correct the error in the data. The customized interface 1352 is used to communicate with the intermediary controller 140 through a channel set CH2.

The die size of the SSD controller 130 is determined by the pads of the channel set CH2 rather by the size of the core. For example, if the quantity of pads of one channel is N and the quantity of channels in the channel set CH2 is M, then total quantity of pads of the SSD controller 130 is N*M.

In this embodiment, the quantity of the flash memories 111, 112 is two, but the quantity of the channel set CH2 connected between the SSD controller 130 and the intermediary controller 140 is only one, rather than two. The quantity of channel sets CH11, CH12 connected between the intermediary controller 140 and the flash memories 111, 112 is two. That is to say, the quantity of the channel set CH2 is less than the quantity of channel sets CH11, CH12. Because the quantity of channel set CH2 is reduced, the total quantity of pads of the SSD controller 130 will be reduced and the die size of the SSD controller 130 can be reduced.

Referring to FIG. 1, the intermediary controller 140 includes at least two flash interfaces 1411, 1412, a customized interface 142 and a data buffering unit 143. The flash interfaces 1411, 1412 are used to communicate with the flash memories 111, 112. The customized interface 142 is connected to and used to communicate with the SSD controller 130. The data buffering unit 143 is connected between the flash interfaces 1411, 1412 and the customized interface 142. The quantity of the customized interface 142 is only one, and the quantity of the flash interfaces 1411, 1412 is two.

Figure 2:
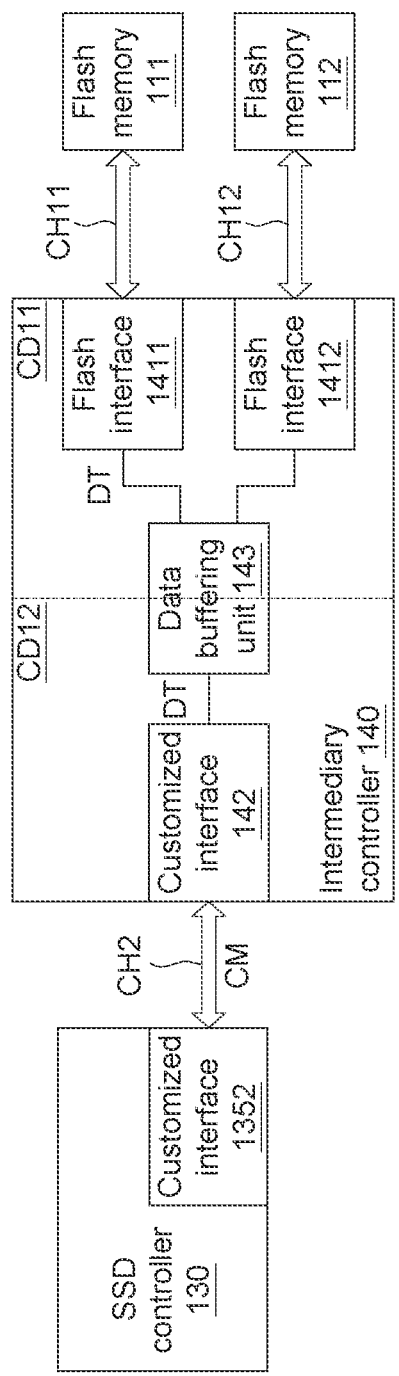
FIG. 2 shows the relationship among the flash memories, the SSD controller and the intermediary controller.
Figure 3:
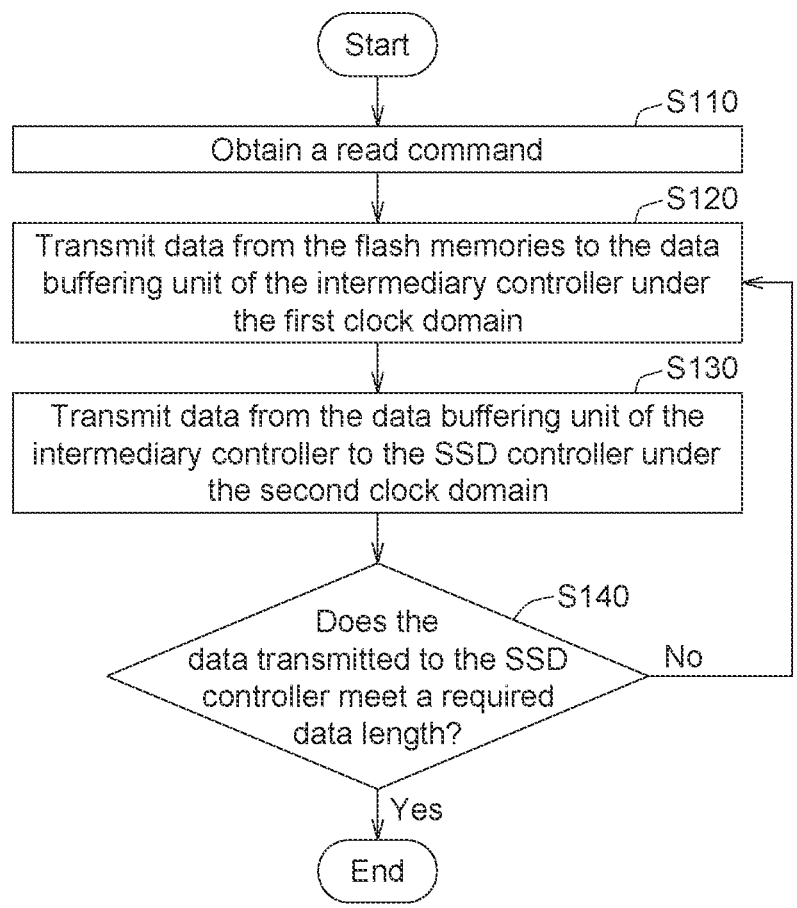
FIG. 3 shows a flowchart of a data transmitting method of the solid state disk according to one embodiment.

Please refer to FIGS. 2 and 3. FIG. 2 shows the relationship among the flash memories 111, 112, the SSD controller 130 and the intermediary controller 140. FIG. 3 shows a flowchart of a data transmitting method of the solid state disk 100 according to one embodiment. The data transmitting method includes steps S110 to S140. The intermediary controller 140 has a first clock domain CD11 and a second clock domain CD12.

At step S110, the intermediary controller 140 obtains a read command CM from the SSD controller 130.

Then, at the step S120, data DT is transmitted from the flash memories 111, 112 to the data buffering unit 143 of the intermediary controller 140 under the first clock domain CD11.

At the step S130, data DT is transmitted from the data buffering unit 143 of the intermediary controller 140 to the SSD controller 130 under the second clock domain CD12. In this embodiment, a frequency of the second clock domain CD12 is higher than a frequency of the first clock domain CD11, so the quantity of channel set CH2 can be less than the quantity of channel sets CH11, CH12. The steps S120 and S130 may be performed at the same time.

Afterwards, at the step S140, the intermediary controller 140 determines whether the data DT transmitted to the SSD controller 130 meets a required data length. If the data DT transmitted to the SSD controller 130 does not meet the required data length, the process returns to the step S120.

Figure 4A:
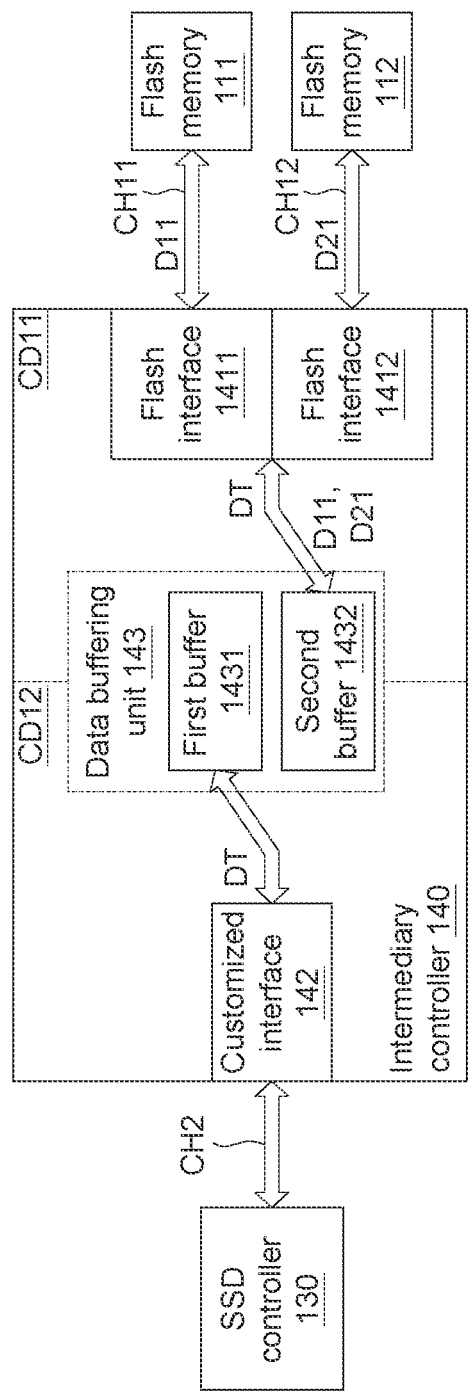
FIGS. 4A and 4B illustrate the operation of the intermediary controller according to one embodiment.
Figure 4B:
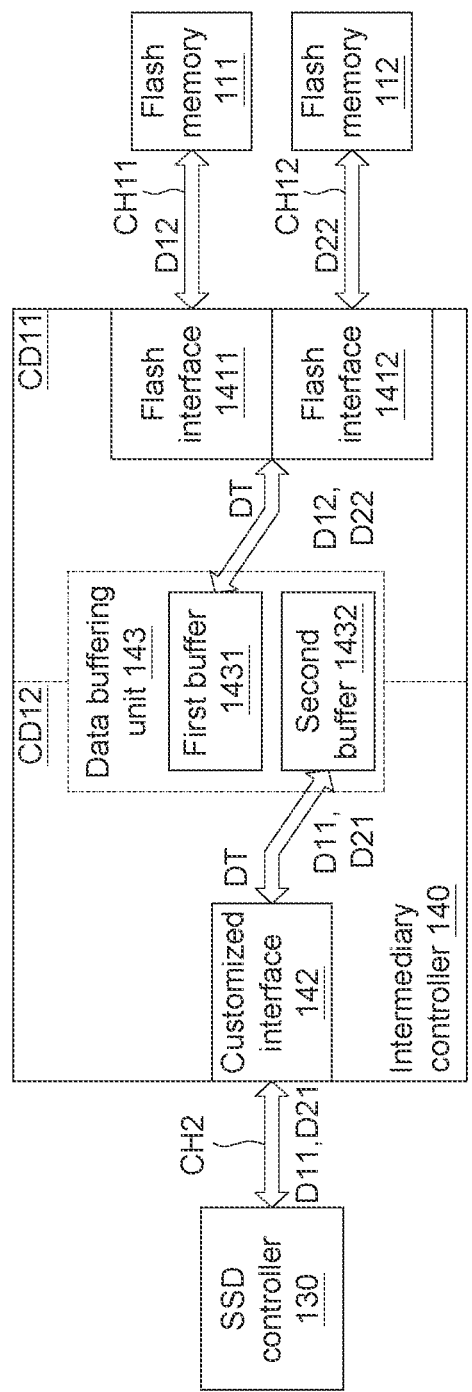
Figure 5:
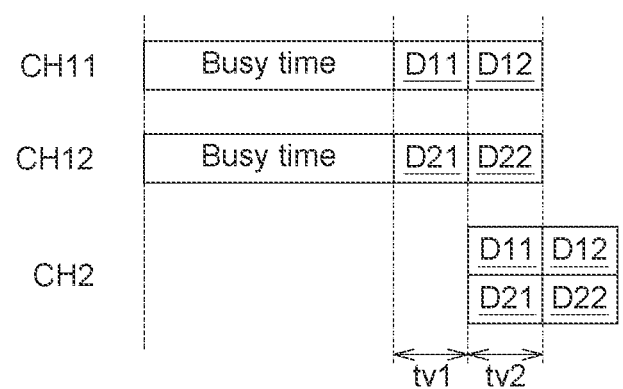
FIG. 5 shows an example of the data transmitting method.

Please refer to FIGS. 4A, 4B and 5. FIGS. 4A and 4B illustrate the operation of the intermediary controller 140 according to one embodiment. FIG. 5 shows an example of the data transmitting method. The data buffering unit 143 includes a first buffer 1431 and a second buffer 1432. The first buffer 1431 is connected to the flash interfaces 1411, 1412 and the customized interface 142. The second buffer 1432 is connected to the flash interfaces 1411, 1412 and the customized interface 142. As shown in FIG. 4A, when the second buffer 1432 receives data DT from the flash memories 111, 112, the first buffer 1431 outputs data DT to the SSD controller 130. As shown in FIG. 4B, when the first buffer 1431 receives data DT from the flash memories 111, 112, the second buffer 1432 outputs data DT to the SSD controller 130.

As shown in FIGS. 4A and 4B, the first buffer 1431 alternately outputs data DT to the SSD controller 130 and receives data DT from the flash memories 111, 112; and the second buffer 1432 alternately receives data DT from the flash memories 111, 112 and outputs data DT to the SSD controller 130.

In one embodiment, a bandwidth of the customized interface 142 is twice as large as a bandwidth of the flash interface 1411 and is twice as large as a bandwidth of the flash interface 1412. As shown in FIG. 4A and FIG. 5, during the time interval tv1, the second buffer 1432 receives data D11, D21 from the flash memories 111, 112. As shown in FIG. 4B and FIG. 5, during the time interval tv2, the first buffer 1431 receives data D12, D22 from the flash memories 111, 112, and the second buffer 1432 outputs data D11, D21 to the SSD controller 130. The frequency of the second clock domain CD12 is at least two times as much as the frequency of the first clock domain CD11 and the bandwidth of the customized interface 142 is twice as large as the bandwidth of each of the flash interfaces 1411, 1412, so receiving the data D12, D22 via the channel sets CH11, CH12 and outputting the data D11, D21 via the channel set CH2 can be done at the same time.

As shown in FIG. 5, a length of the time interval tv1 for receiving data D11, D21 from the flash memories 111, 112 is substantially identical to a length of the time interval tv2 for outputting data D11, D21 to the SSD controller 130. The frequency of the second clock domain CD12 is at least two times as much as the frequency of the first clock domain CD11 and the bandwidth of the customized interface 142 is twice as large as the bandwidth of each of the flash interfaces 1411, 1412, so the time interval tv1 for receiving data D11, D21 from the flash memories 111, 112 can be substantially identical to the time interval tv2 for outputting data D11, D21 to the SSD controller 130.

According to the embodiments described above, the frequency of the second clock domain CD12 is higher than the frequency of the first clock domain CD11, so the quantity of channel set CH2 can be less than the quantity of channel sets CH11, CH12. Therefore, the total quantity of pads of the SSD controller 130 can be reduced and the die size of the SSD controller 130 can be reduced.

Figure 6A:
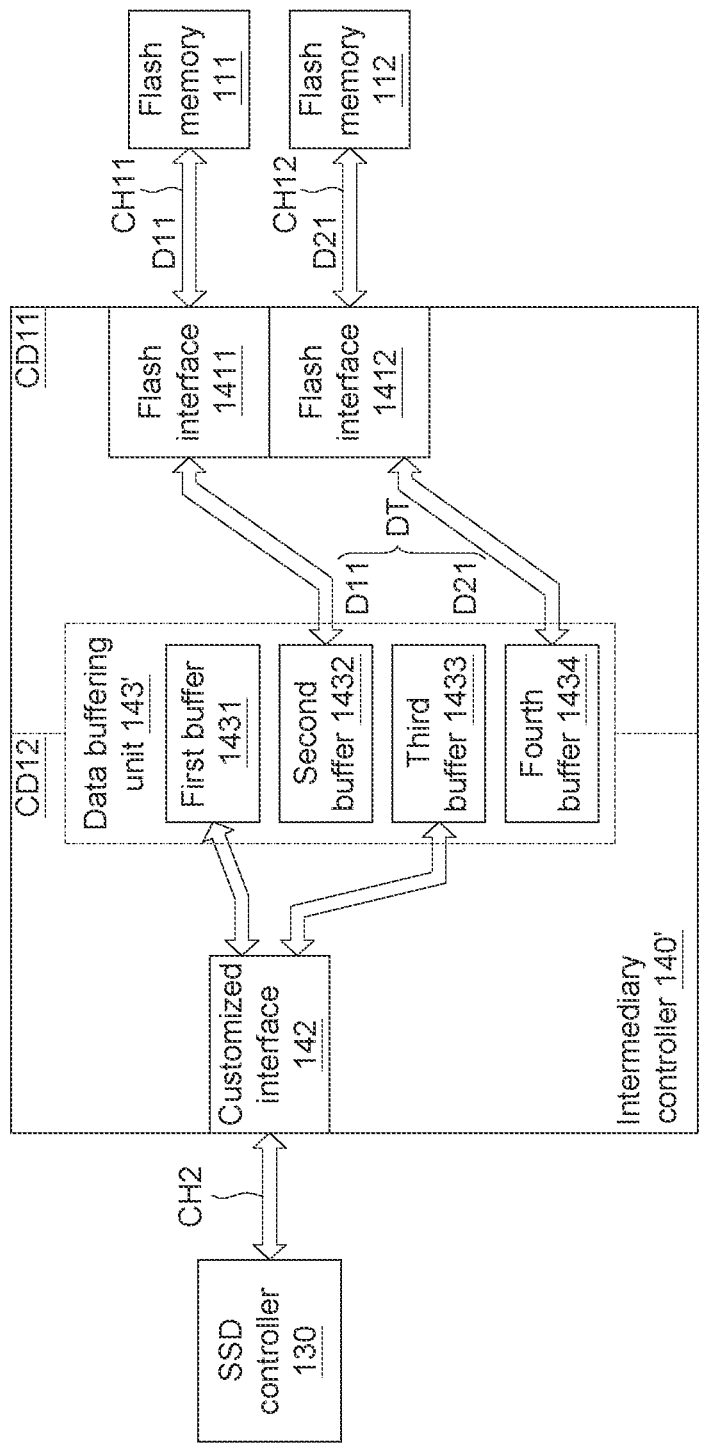
FIGS. 6A and 6B illustrate the operation of an intermediary controller according to another embodiment.
Figure 6B:
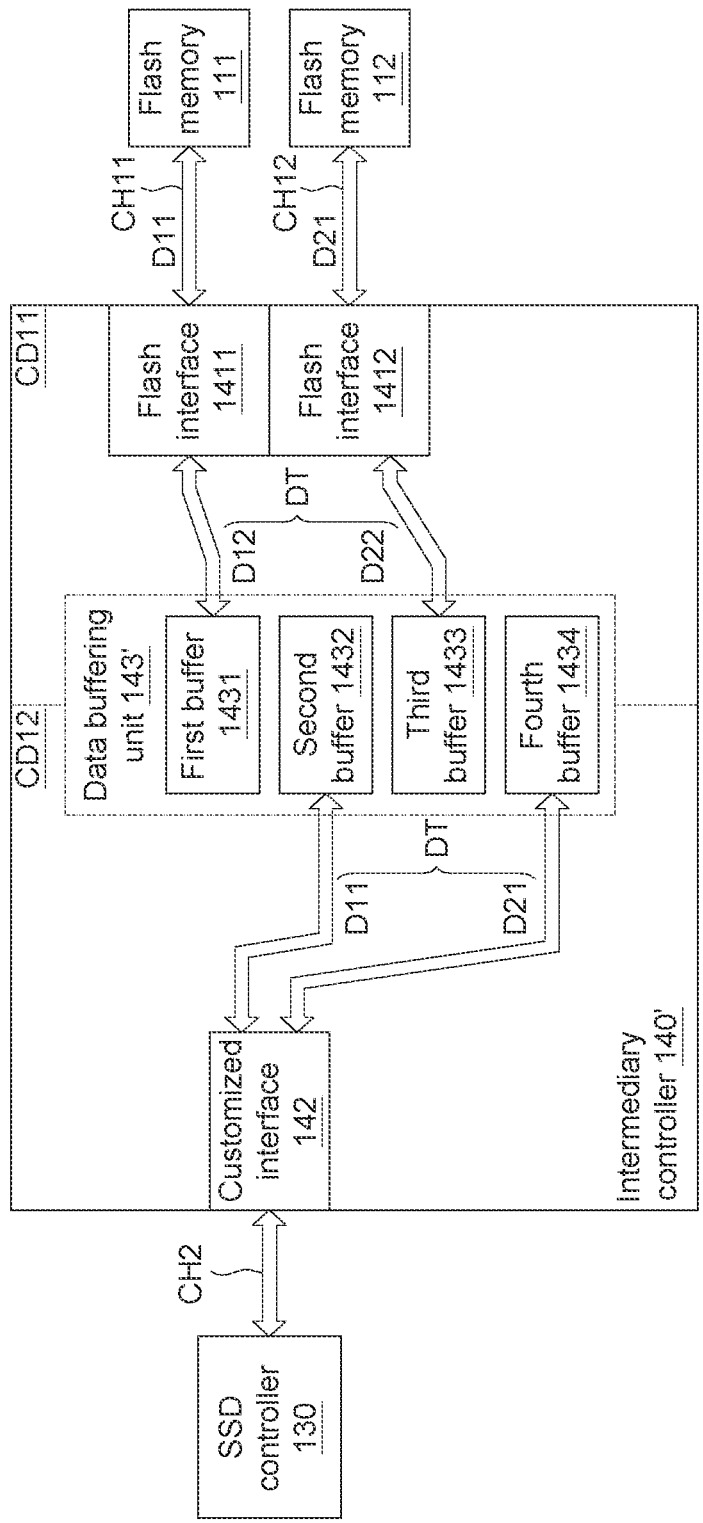
Figure 7:
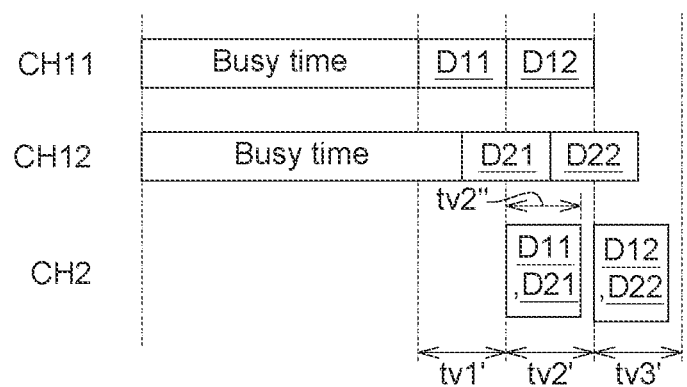
FIG. 7 shows another example of the data transmitting method.

Please refer to FIGS. 6A, 6B and 7. FIGS. 6A and 6B illustrate the operation of an intermediary controller 140' according to another embodiment. FIG. 7 shows another example of the data transmitting method. A data buffering unit 143' of the intermediary controller 140' includes the first buffer 1431, the second buffer 1432, a third buffer 1433 and a fourth buffer 1434. The first buffer 1431 and the second buffer 1432 are connected to the flash interface 1411 and the customized interface 142. The third buffer 1433 and the fourth buffer 1434 are connected to the flash interface 1412 and the customized interface 142. As shown in FIG. 6A, when the second buffer 1432 and the fourth buffer 1434 receive data DT from the flash memories 111, 112, the first buffer 1431 and the third buffer 1433 output data DT to the SSD controller 130. As shown in FIG. 6B, when the first buffer 1431 and the third buffer 1433 receive data DT from the flash memories 111, 112, the second buffer 1432 and the fourth buffer 1434 output data DT to the SSD controller 130.

As shown in FIGS. 6A and 6B, the first buffer 1431 and the third buffer 1433 alternately output data DT to the SSD controller 130 and receive data DT from the flash memories 111, 112; and the second buffer 1432 and the fourth buffer 1434 alternately receive data DT from the flash memories 111, 112 and output data DT to the SSD controller 130.

In one embodiment, the bandwidth of the customized interface 142 is twice as large as the bandwidth of the flash interface 1411 and is twice as large as the bandwidth of the flash interface 1412. The frequency of the second clock domain CD12 is at least two times as much as the frequency of the first clock domain CD11 and the bandwidth of the customized interface 142 is twice as large as the bandwidth of each of the flash interfaces 1411, 1412, so receiving the data D12, D22 via the channel sets CH11, CH12 and outputting the data D11, D21 via the channel set CH2 can be done at the same time.

As shown in FIG. 7, the busy time of the channel set CH11 is different from the busy time of the channel set CH12. At the beginning of the time interval tv2', receiving the data D11 from the flash memory 111 is finished, but receiving the data D21 from the flash memory 112 is not finished. During the time interval tv2', outputting the data D11 to the SSD controller 130 may be performed first, and then outputting the data D21 to the SSD controller 130 is performed. At the beginning of the time interval tv3', receiving the data D12 from the flash memory 111 is finished, but receiving the data D22 from the flash memory 112 is not finished. During the time interval tv3', outputting the data D12 to the SSD controller 130 may be performed first, and then outputting the data D22 to the SSD controller 130 is performed.

The time interval tv1' for receiving data D11 from the flash memory 111 may be longer than the time interval tv2" for outputting data D11 to the SSD controller 130.

According to the embodiments described above, the frequency of the second clock domain CD12 is higher than the frequency of the first clock domain CD11, so the quantity of channel set CH2 can be less than the quantity of channel sets CH11, CH12. Therefore, the total quantity of pads of the SSD controller 130 can be reduced and the die size of the SSD controller 130 can be reduced.

In another embodiment, if the quantity of the flash memories 111, 112, . . . is N, the frequency of the second clock domain CD12 is at least N times as much as the frequency of the first clock domain CD11, and the bandwidth of the customized interface 142 is at least N times of the bandwidth of each of the flash interfaces 1411, 1412, . . . .

Figure 8:
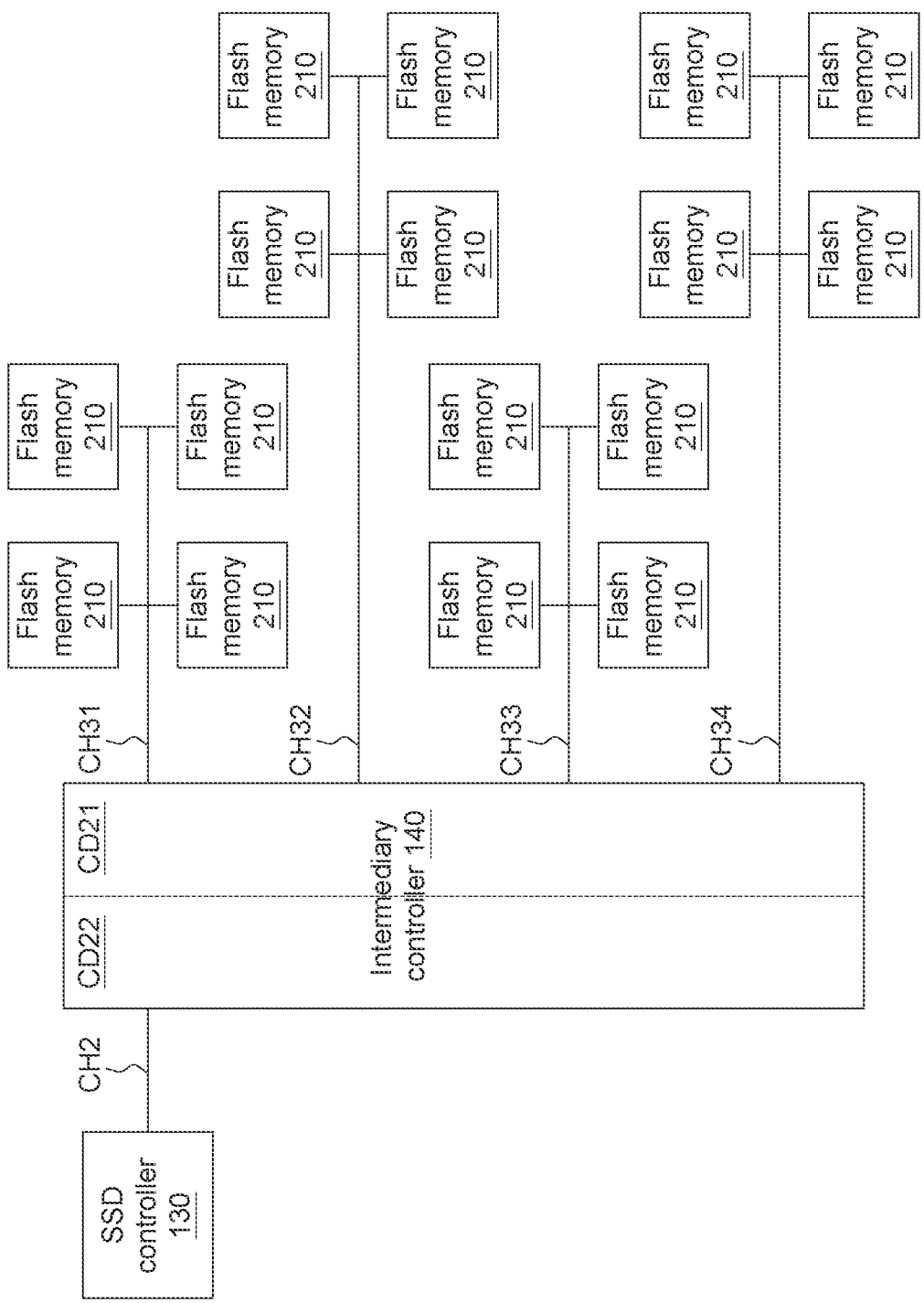
FIG. 8 shows a block diagram of a solid state disk according to another embodiment is shown.

Please referring to FIG. 8, a block diagram of a solid state disk 200 according to another embodiment is shown. In the embodiment of FIG. 8, a quantity of channel sets CH31, CH32, CH33, CH34 connected between the flash memories 210 and the intermediary controller 140 is 4. In this embodiment, a frequency of the second clock domain CD22 is at least four times as much as a frequency of the first clock domain CD21, so the quantity of channel set CH2 can be less than the quantity of channel sets CH31, CH32, CH33, CH34. Therefore, the total quantity of pads of the SSD controller 130 can be reduced and the die size of the SSD controller 130 can be reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A solid state disk (SSD), comprising:
   at least two flash memories;
   a SSD controller, comprising an error-correcting code engine; and
   an intermediary controller, connected between the flash memories and the SSD controller, the intermediary controller includes:
      at least two flash interfaces, connected to the flash memories;
      a customized interface, connected to the SSD controller; and
      a data buffering unit, connected between the flash interfaces and the customized interface, wherein the intermediary controller has a first clock domain and a second clock domain, the first clock domain is used when data is transmitted from the flash memories to the data buffering unit, the second clock domain is used when data is transmitted from the data buffering unit to the SSD controller, and a frequency of the second clock domain is higher than a frequency of the first clock domain,
   wherein the intermediary controller determines whether the data transmitted to the SSD controller meets a required data length and the error-correcting code engine is used to correct the error in the data from the intermediary controller.

2. The solid state disk according to claim 1, wherein the frequency of the second clock domain is at least two times as much as the frequency of the first clock domain.

3. The solid state disk according to claim 1, wherein a quantity of channel set connected between the SSD controller and the intermediary controller is less than a quantity of channel sets connected between the intermediary controller and the flash memories.

4. The solid state disk according to claim 1, wherein a bandwidth of the customized interface is at least twice as large as a bandwidth of each of the flash interfaces.

5. The solid state disk according to claim 1, wherein the data buffering unit includes:
   a first buffer, connected to the flash interfaces and the customized interface; and
   a second buffer, connected to the flash interfaces and the customized interface;
   wherein when one of the first buffer and the second buffer receives data from the flash memories, another one of the first buffer and the second buffer outputs data to the SSD controller.

6. The solid state disk according to claim 5, wherein the first buffer alternately receives data from the flash memories and outputs data to the SSD controller.

7. The solid state disk according to claim 6, wherein a time interval for receiving data from the flash memories is substantially identical to or longer than a time interval for outputting data to the SSD controller.

8. The solid state disk according to claim 1, wherein the data buffering unit includes:
   a first buffer and a second buffer, connected to one of the flash interfaces and the customized interface;
   a third buffer and a fourth buffer, connected to another one of the flash interfaces and the customized interface;
   wherein when the first buffer and the third buffer receive data from the flash memories, the second buffer and the fourth buffer output data to the SSD controller; and when the second buffer and the fourth buffer receive data from the flash memories, the first buffer and the third buffer output data to the SSD controller.

9. A data transmitting method of a solid state disk (SSD), wherein the solid state disk includes at least two flash memories, a SSD controller and an intermediary controller, the SSD controller comprises an error-correcting code engine, and the data transmitting method comprises:

transmitting data from the flash memories to the intermediary controller under a first clock domain; and transmitting data from the intermediary controller to the SSD controller under a second clock domain;

wherein a frequency of the second clock domain is higher than a frequency of the first clock domain, wherein the intermediary controller determines whether the data transmitted to the SSD controller meets a required data length and the error-correcting code engine is used to correct an error in the data from the intermediary controller.

10. The data transmitting method according to claim 8, wherein the frequency of the second clock domain is at least two times as much as the frequency of the first clock domain.

11. The data transmitting method according to claim 9, wherein a quantity of channel set connected between the SSD controller and the intermediary controller is less than a quantity of channel sets connected between the intermediary controller and the flash memories.

12. The data transmitting method according to claim 9, wherein the data buffering unit includes a first buffer and a second buffer, and when one of the first buffer and the second buffer receives data from the flash memories, another one of the first buffer and the second buffer outputs data to the SSD controller.

13. The data transmitting method according to claim 12, wherein the first buffer alternately receives data from the flash memories and outputs data to the SSD controller.

14. The data transmitting method according to claim 13, wherein a time interval for receiving data from the flash memories is substantially identical to or longer than a time interval for outputting data to the SSD controller.

15. The data transmitting method according to claim 9, wherein the data buffering unit includes a first buffer, a second buffer, a third buffer and a fourth buffer; when the first buffer and the third buffer receive data from the flash memories, the second buffer and the fourth buffer output data to the SSD controller; and when the second buffer and the fourth buffer receive data from the flash memories, the first buffer and the third buffer output data to the SSD controller.

16. An intermediary controller, connected between at least two flash memories and a solid state disk controller (SSD controller), wherein the SSD controller comprises an error-correcting code engine, wherein the intermediary controller includes:

at least two flash interfaces, connected to the flash memories;

a customized interface, connected to the SSD controller; and a data buffering unit, connected between the flash interfaces and the customized interface, wherein the intermediary controller has a first clock domain and a second clock domain, the first clock domain is used when data is transmitted from the flash memories to the data buffering unit, the second clock domain is used when data is transmitted from the data buffering unit to the SSD controller, and a frequency of the second clock domain is higher than a frequency of the first clock domain, wherein the intermediary controller determines whether the data transmitted to the SSD controller meets a required data length and the error-correcting code engine is used to correct an error in the data from the intermediary controller.

17. The intermediary controller according to claim 16, wherein the frequency of the second clock domain is at least two times as much as the frequency of the first clock domain.

18. The intermediary controller according to claim 16, wherein a quantity of channel set connected between the SSD controller and the intermediary controller is less than a quantity of channel sets connected between the intermediary controller and the flash memories.

19. The intermediary controller according to claim 16, wherein a bandwidth of the customized interface is at least twice as large as a bandwidth of each of the flash interfaces.

20. The intermediary controller according to claim 16, wherein the data buffering unit includes:

a first buffer, connected to the flash interfaces and the customized interface; and a second buffer, connected to the flash interfaces and the customized interface;

wherein when one of the first buffer and the second buffer receives data from the flash memories, another one of the first buffer and the second buffer outputs data to the SSD controller.

* * * * *